June 2, 1942.                J. B. FERGUSON                2,285,024
                          SAMPLE TAKING APPARATUS
                           Filed Aug. 11, 1939              2 Sheets-Sheet 1

Inventor
JOHN B. FERGUSON
By Jesse R Stone
   Lister B Clark
         Attorneys

June 2, 1942.　　　　　J. B. FERGUSON　　　　　2,285,024
SAMPLE TAKING APPARATUS
Filed Aug. 11, 1939　　　2 Sheets-Sheet 2

Inventor
JOHN B. FERGUSON
By Jesse R Stone
Lester B Clark
Attorneys

Patented June 2, 1942

2,285,024

UNITED STATES PATENT OFFICE 2,285,024

SAMPLE TAKING APPARATUS

John B. Ferguson, Wharton, Tex.

Application August 11, 1939, Serial No. 289,519

5 Claims. (Cl. 255—1.4)

This invention relates to sample taking apparatus.

An object of the invention is to provide means for taking a sample of the formation from the side wall of a well bore and for withdrawing the sample through the drill stem to the ground surface for inspection.

It is another object of the invention to provide sample taking apparatus adapted to be lowered through the drill stem and projected laterally through the drill into contact with the side wall of the well bore and to be actuated by manipulation of the drill stem to penetrate into the formation of the wall to receive and entrap a sample of said formation which may be then withdrawn through the stem to the ground surface without withdrawing the stem and drill.

With the above and other objects in view the invention has particular relation to certain novel features of construction, operation and arrangement of parts, an example of which is given in this specification and illustrated in the accompanying drawings, wherein—

Figure 1:
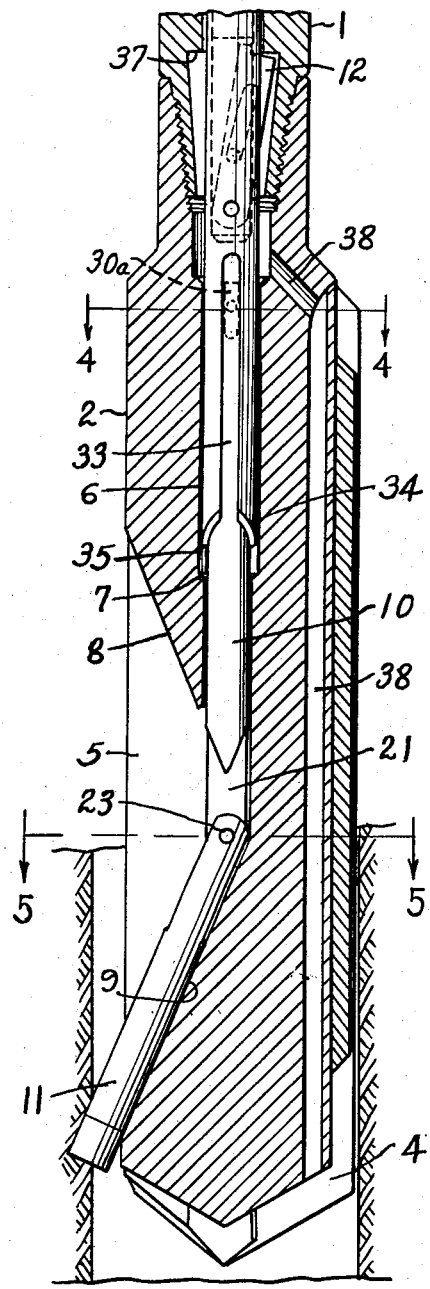
Figure 1 shows a vertical, sectional view of the drill showing the sample taking device latched in operative position therein.
Figure 2:
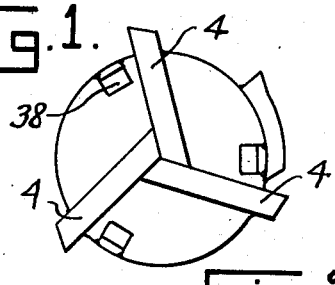
Figure 2 shows a plan view of the forward end of the drill.

In the drawings the numeral 1 designates a tubular drill stem which extends to the ground surface and to the lower end of which a drill 2 is attached.

This drill, as shown, consists of an elongated, cylindrical body having the vertical, side reaming blades 3, 3 spaced apart therearound and whose forward margins terminate in reaming edges. The drill also has the lower end cutting blades 4 which converge downwardly across the forward end of the drill and terminate in an apex as more clearly illustrated in Figures 1 and 3. These blades also terminate in marginal, forwardly directed cutting edges. However, the particular construction of the drill and the arrangement of the cutting blades thereon may be varied. The type of drill shown has not been designed particularly for drilling the bore but rather for removing obstructions in advance of the drill from the bore while lowering the drill and stem into a bore previously formed.

Figure 3:
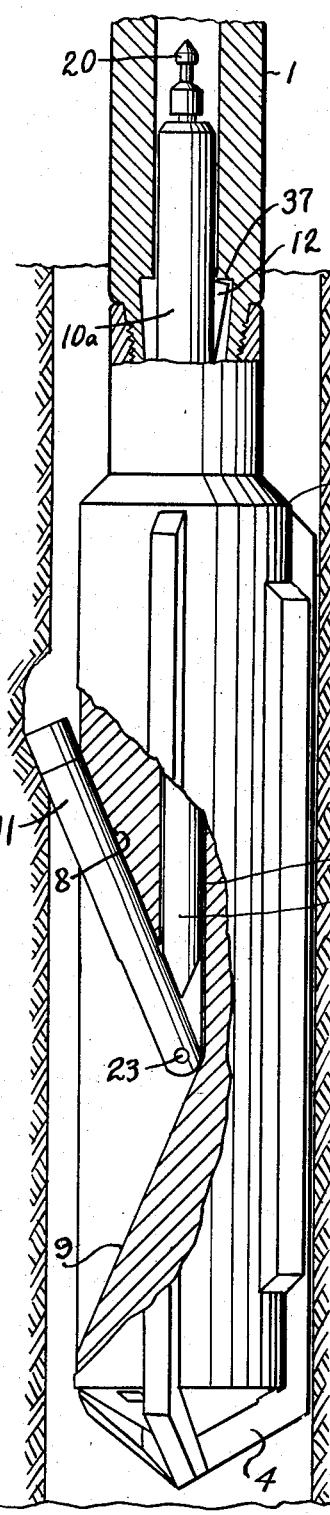
Figure 3 shows a side elevation of the drill, partly in section, showing the sample taking apparatus mounted therein after the sample has been taken.
Figure 4:
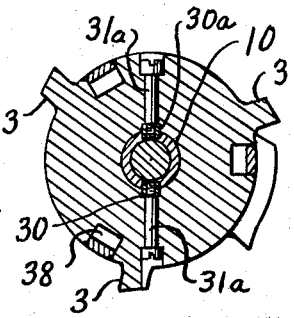
Figure 4 shows a cross-sectional view taken on the line 4—4 of Figure 1.
Figure 5:
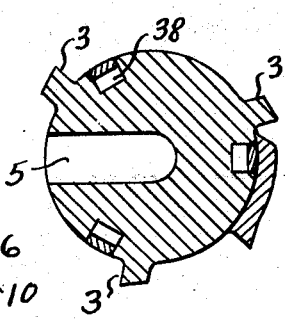
Figure 5 shows a cross-sectional view taken on the line 5—5 of Figure 1.

The passageway through the drill stem continues on down through the drill 2 and terminates in a side slot 5. This passageway through the drill is indicated by the numeral 6 and near its lower end is reduced in diameter forming an upwardly facing annular shoulder 7. The side slot 5 is of substantially uniform width, as shown in Figure 5 but its upper and lower ends diverge forming the upper abutment 8 and the lower guide 9 as illustrated in Figures 1 and 3.

Figure 6:
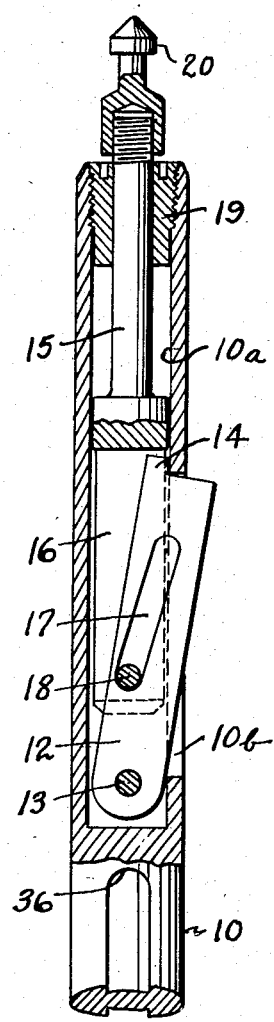
Figure 6 shows a side elevation, partly in section, showing the upper end of the sample taking apparatus.
Figure 7:
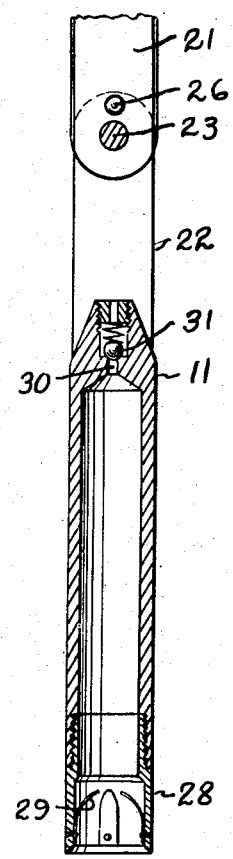
Figure 7 shows a sectional view of the lower end thereof.
Figure 8:
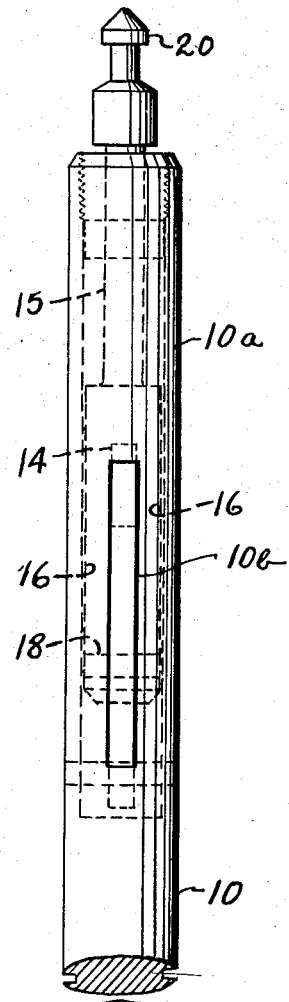
Figure 8 shows a fragmentary, side elevation taken at right angles to the view shown in Figure 6.

The sample taking apparatus proper consists of a mandrel 10 and a sample taking barrel 11 as shown in Figures 6 and 7. The upper end of the mandrel 10 is formed with a cylinder 10a having a vertical side slot 10b. Within the cylinder 10a there is a latch 12 whose lower end is pivoted on the cross-pin 13 and whose upper end works through the slot 10b. The upper end of this latch has an inside shoulder 14 engageable against the inside of the cylinder 10a to limit the outward movement of the latch as shown in Figure 6. There is a latch actuator comprising a stem 15 whose lower end is slotted forming the side prongs 16, 16 which embrace said latch as shown in Figures 6 and 8. The latch has a longitudinal slot 17 therethrough which diverges outwardly with respect to the axes of the mandrel and an actuating cross-pin 18 has its ends anchored to the prongs 16 and which works through the slot 17.

The stem 15 works closely through a gland 19 screwed into the upper end of the cylinder 10a and the upper end of said stem carries a conical shaped head 20 for engagement with a fishing tool or grapple attached to a wire line whereby the apparatus may be withdrawn from the drill stem when a sample has been taken. The lower end of the mandrel is reduced on each side forming a hinge member 21 and the upper end of the barrel 11 has the spaced side links 22, 22 connected rigidly thereto whose free ends embrace the hinge member 21 and are pivoted thereto by means of the cross-pin 23 thus forming a two way hinge. The hinge member 21 has a deep socket 24 containing a coil spring 25 on which there is seated a ball 26 which normally is held yieldingly seated in an inside recess 27 in the upper end of one of the links 22 whereby the barrel 11 is normally maintained in axial alignment with the mandrel. The free end of the sample receiving barrel 11 is formed with a detachable bit 28 terminating at its free end in an annular sharp penetrating edge and said bit may be provided with the flexible sample retainers whose lower ends are anchored to the bit and whose upper ends are inwardly curved as shown in Figure 7 so as to permit the sample to enter in the barrel but to entrap it therein. The upper end of the core barrel has an outlet port 30 controlled by the back pressure valve 31 whereby liquid in the barrel may be permitted to escape as the sample enters.

Secured within the upper end of the passageway 6 are the oppositely disposed guide lugs 30a which may be secured therein in any suitable manner as by the set screws 31a. On opposite sides of the mandrel 10 and in alignment with the cross-pin 23 which connects the hinge member 21 with the links 22, there are the longitudinal grooves 33 whose lower ends are flared forming the diverging guide faces 34, 34 which merge at the apexes 35, 35. The upper ends of the grooves 33 terminate in the downwardly facing shoulders 36.

With the drill stem and drill in the bore the sample taking apparatus, as assembled in Figures 6 and 7, may be dropped through the stem and the guide faces 34 when they come into contact with the lugs 30a will align the grooves 33 with said guide lugs 30a and said guide lugs will will enter the grooves 33. The lower end of the barrel will be guided outwardly by the guide face 9 into contact with the wall of the well bore as shown in Figure 1. The sample taking apparatus is guided by the lugs 30a into position in the drill such that the axis of the cross-pin 22 on which the barrel 11 operates will extend transversely of the slot 5 so as to give the barrel 11 the required freedom of movement about its hinged connection with the mandrel 10.

When the sample taking apparatus lands in home position as shown in Figure 1 the upper end of the latch 12 will have engaged the inside, annular, downwardly facing shoulder 37 in the drill stem and will thus latch the sample taking apparatus against upward movement in the drill.

Upon lowering of the drill stem and drill the free end of the core barrel will penetrate into the wall of the bore and a substantial sample of the wall formation will be forced into the core barrel. Upon a continuation of said downward movement the core barrel will assume a retracted position as shown in Figure 3 until it comes into contact with the abutment 8. Upon elevation of the drill stem and drill the core barrel will be again caused to penetrate into the wall of the formation so that additional formation may be forced into the barrel if it has not already been filled and the barrel will again assume the position shown in Figure 1. A wire line with a grapple suspended therefrom may be then lowered through the drill stem and engaged with the head 20. Upon an upward pull the latch will be released and the mandrel and core barrel may then be withdrawn to the ground surface for an inspection of the sample.

It will be noted from an inspection of Figure 1 that the upper end of the passageway 6 is enlarged and diverging downwardly from said enlarged upper end are the channels 38 which continue on down through the drill and emerge at the lower end thereof. These channels are provided for the circulation of drilling fluid when and if desired.

The drawings and description are illustrative merely, while the broad principles of the invention will be defined by the appended claims.

What I claim is:

1. A device for taking side wall samples from a well bore comprising the combination of a tubular drill stem and drill, a side slot in said drill having outwardly flared upper and lower abutment and guiding surfaces, a sample taking assembly shaped to be lowered through and retrieved from within the drill stem, said assembly including a pivotally mounted sample receiver at its lower end, cooperating means in the bore and on said assembly to guide the assembly to a predetermined position within the bore so that the sample receiver moves outwardly over the guiding face and into contact with the wall of the well bore, and means for locking the sample taking assembly within the drill during the taking of a sample, whereby a side wall sample enters the sample chamber by the lowering and subsequent lifting of the drill stem and drill after the sample taking assembly is locked therein.

2. A device for taking side wall samples from a well bore comprising the combination of a tubular drill stem and drill, a side slot in said drill having outwardly flared upper and lower abutment and guiding surfaces, guide lugs in the bore above said slot, a sample taking assembly shaped to be lowered through and retrieved from within the drill stem and including a mandrel having a reduced portion, longitudinal slots in the mandrel adjacent said reduced portion, the ends of said slots terminating in diverging faces adapted to guide the assembly so that the guide lugs enter the slots, a sample receiver pivotally mounted upon the end of the mandrel to move outwardly over the guiding face in the side slot and into contact with the wall of the well bore whereby this sample receiver penetrates the wall of the well bore as the drill stem and drill are lowered and thereafter raised within the bore, and means for locking the sample taking assembly within the drill during the taking of a side wall sample.

3. A side wall sampling device for lowering into a well bore and including, a housing having an opening therein, sampling means movable within the housing and through the opening, means for orienting the sampling means within the housing and means for guiding the sampling means through said opening and into engagement with the wall of the well bore, whereby a sample of the wall may be obtained.

4. A side wall sampling device which is adapted to be lowered into a well bore and includes, a housing having a longitudinal opening, sampling means designed to be passed through said opening, means for orienting the sampling means within the housing means for locking said sampling means in position within said opening, and means for forcing said sampling means into engagement with a side wall of the well bore whereby a sample is taken of said side wall.

5. A side wall sampling device which is adapted to be lowered into a well bore and includes, a drill body having a longitudinal opening therein, a drill bit on the lower extremity of said drill body, sampling means designed to be passed through said opening, means for orienting the sampling means within the housing means for locking said sampling means in position within said opening, and means for forcing said sampling means into engagement with a side wall of the bore whereby a sample is taken of said side wall.

JOHN B. FERGUSON.